United States Patent
Liberg et al.

(10) Patent No.: US 11,621,878 B2
(45) Date of Patent: Apr. 4, 2023

(54) NB-IOT-U BASEBAND DEFINITION

(71) Applicant: TELEFONAKTIEBOLAGET LM ERICSSON (PUBL), Stockholm (SE)

(72) Inventors: Olof Liberg, Stockholm (SE); David Sugirtharaj, Lund (SE); Yi-Pin Eric Wang, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 663 days.

(21) Appl. No.: 16/462,105

(22) PCT Filed: May 2, 2019

(86) PCT No.: PCT/IB2019/053615
§ 371 (c)(1),
(2) Date: May 17, 2019

(87) PCT Pub. No.: WO2020/152513
PCT Pub. Date: Jul. 30, 2020

(65) Prior Publication Data
US 2021/0336731 A1    Oct. 28, 2021

Related U.S. Application Data

(60) Provisional application No. 62/796,501, filed on Jan. 24, 2019.

(51) Int. Cl.
*H04L 27/26* (2006.01)
*G16Y 10/75* (2020.01)
*H04L 5/00* (2006.01)

(52) U.S. Cl.
CPC ......... *H04L 27/2634* (2013.01); *G16Y 10/75* (2020.01); *H04L 5/0023* (2013.01); *H04L 27/2602* (2013.01)

(58) Field of Classification Search
CPC .............. H04L 5/0023; H04L 27/2602; H04L 27/2634; G16Y 10/75
See application file for complete search history.

(56) References Cited

U.S. PATENT DOCUMENTS

| | | | |
|---|---|---|---|
| 2011/0002403 A1* | 1/2011 | Wilhelmsson | ........ H04L 25/022 375/260 |
| 2018/0054340 A1 | 2/2018 | Rico Alvarino et al. | |
| 2019/0182094 A1* | 6/2019 | Gaal | ........... H04L 27/2607 |

OTHER PUBLICATIONS

Neul et al., "PAPR reduction for single-tone PUSCH transmissions", 3GPP RAN WG1 NB-IoT Ad-Hoc Meeting, R1-160100, Budapest, Hungary, Jan. 18-20, 2016.
(Continued)

*Primary Examiner* — Kabir A Timory
(74) *Attorney, Agent, or Firm* — Withrow & Terranova, PLLC

(57) ABSTRACT

A method performed by a network node in a wireless communications system is disclosed. The method comprises generating a time-continuous baseband signal by applying a phase compensation that removes a physical resource block (PRB)-dependent phase rotation on a subcarrier. The method comprises converting the generated time-continuous baseband signal into a radio frequency signal. The method comprises transmitting the radio frequency signal to a wireless device over a radio interface.

18 Claims, 11 Drawing Sheets

---

400

401
Generate a time-continuous baseband signal by applying a phase compensation that removes a physical resource block (PRB)-dependent phase rotation on a subcarrier.

402
Convert the generated time-continuous baseband signal into a radio frequency signal.

403
Transmit the radio frequency signal to a wireless device over a radio interface.

(56) References Cited

OTHER PUBLICATIONS

Spreadtrum Communications, "Remanining issues on OFDM signal generation", 3GPP RAN WG1 AH 1801, R1-1800284, Vancouver, Canada, Jan. 22-26, 2018.
Electronic Code of Federal Regulations, §15.247 Operation within the bands 902-928 MHz, 2400-2483.5 MHz, and 5725-5850 MHz.
Intel, "R1-1721601: Correcting NR OFDM Symbol Generation," 3GPP TSG RAN WG1 Meeting #91, Nov. 26-Dec. 1, 2017, Reno, Nevada, 17 pages.
Shin, et al., "Structure of NB-IoT NodeB system," International Conference on Information and Communication Technology Convergence, 2017, IEEE, pp. 1269-1271.
Notice of Reasons for Refusal for Japanese Patent Application No. 2021-541598, dated Oct. 4, 2022, 10 pages.

\* cited by examiner

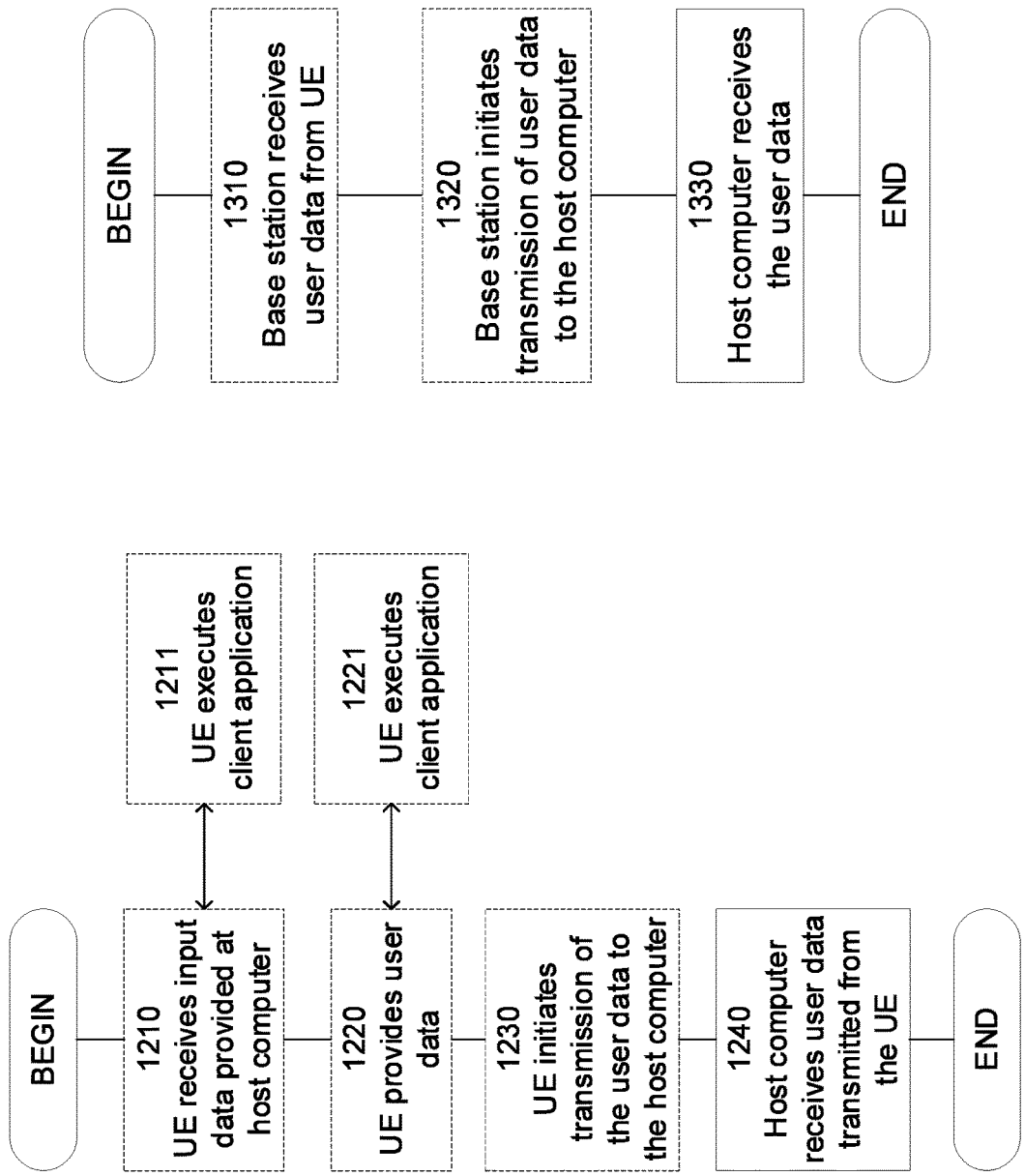

NB-IOT-U BASEBAND DEFINITION

RELATED APPLICATIONS

This application is national phase of PCT Patent Application No. PCT/IB2019/053615, filed May 2, 2019, which claims the benefit of U.S. Provisional Patent Application No. 62/796,501, filed Jan. 24, 2019, the disclosures of which are hereby incorporated herein by references in their entirety.

TECHNICAL FIELD

The present disclosure relates, in general, to wireless communications and, more particularly, to Narrowband Internet-of-Things (NB-IoT) baseband definition.

BACKGROUND

In Release 13, the 3$^{rd}$ Generation Partnership Project (3GPP) developed NB-IoT. NB-IoT is a radio access technology (RAT) that provides connectivity to services and applications demanding qualities such as reliable indoor coverage and high capacity in combination with low system complexity and optimized power consumption.

The NB-IoT downlink uses Orthogonal Frequency Division Multiplexing (OFDM) modulation based on a 15 kilohertz (kHz) sub-carrier spacing. The system bandwidth is defined by 12 sub-carriers and spans in total 180 kHz, or 1 Physical Resource Block (PRB).

This narrow system bandwidth allows NB-IoT to support a high-level of deployment flexibility. It can be deployed as a stand-alone system (e.g., in Global System for Mobile communications (GSM) spectrum), in the guard-band, or within a Long-Term Evolution (LTE) carrier.

To facilitate this flexibility, and at the same time allow the LTE baseband definition to be reused, the NB-IoT baseband specification defines two alternative implementations.

In the case of a stand-alone system, or when operating in the LTE guard-band, 3GPP TS 36.211 v15.0.0 defines the NB-IoT downlink baseband signal $s_l^{(p)}(t)$ as follows:

the time-continuous signal $s_l^{(p)}(t)$ on antenna port P in OFDM symbol l in a
downlink slot is defined by $$s_l^{(p)}(t) = \sum_{k=-\lfloor N_{sc}^{RB}/2 \rfloor}^{k=\lceil N_{sc}^{RB}/2 \rceil-1} a_{k^{(-)},l}^{(p)} \cdot e^{j2\pi(k+1/2)\Delta f(t-N_{CP,l}T_s)}$$

for $0 \leq t < (N_{CP,l}+N) \times T_s$, where $k^{(-)}=k+\lfloor N_{sc}^{RB}/2 \rfloor$, N=2048, $\Delta f$=15 kHz and $a_{k,l}^{(p)}$
is the content of resource element (k,l) on antenna port p, where $N_{sc}^{RB}$=12.

Notably, NB-IoT does not insert a blank sub-carrier (known as the DC sub-carrier in LTE) in the center of the waveform. Instead, the center frequency is located in-between sub-carriers indexed by k=0 and k=1.

In the case of in-band deployments, the intent is to allow LTE base stations to reuse the LTE baseband definition and replace an LTE PRB with a NB-IoT PRB. For in-band deployments, the following definition applies, where $s_{l'}^{(p)}(t)$ provides a joint baseband definition for LTE and NB-IoT:

the time-continuous signal $s_{l'}^{(p)}(t)$ on antenna port p in OFDM symbol l',
where $l'=l+N_{symb}^{DL}(n_s \bmod 4) \in \{0, \ldots, 27\}$ is the OFDM symbol index from the start of the last even-numbered subframe, is defined by $$s_{l'}^{(p)}(t) = \sum_{k=-\lfloor N_{RB}^{DL}N_{sc}^{RB}/2 \rfloor}^{-1} e_{k^{(-)},l'}^{\theta} \cdot a_{k^{(-)},l'}^{(p)} \cdot e^{j2\pi k \Delta f \left(t - N_{CP,l'\bmod N_{symb}^{DL}} T_s\right)} +$$

$$\sum_{k=1}^{\lceil N_{RB}^{DL}N_{sc}^{RB}/2 \rceil} e_{k^{(+)},l'}^{\theta} \cdot a_{k^{(+)},l'}^{(p)} \cdot e^{j2\pi k \Delta f \left(t - N_{CP,l'\bmod N_{symb}^{DL}} T_s\right)}$$

for $0 \leq t < (N_{CP,l}+N) \times T_s$ where $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor - 1$, $$\theta_{k,l'} = j2\pi f_{NB-IoT} T_s \left( l'N + \sum_{i=0}^{l'} N_{CP,i\bmod 7} \right)$$

if resource element (k,l') is used for Narrowband IoT except for NPRS, and 0 otherwise including NPRS. The quantity $f_{NB-IoT}$ is the frequency location of the center of the Narrowband IoT PRB minus the frequency location of the center of the LTE signal.

The basic equation defining $s_l^{(p)}(t)$ can be recognized from the LTE baseband specification in 3GPP TS 36.211 v15.0.0. There is room for an empty DC sub-carrier at index k=0. Notably, there is a new phase compensation term $\theta_{k,l'}$. The phase compensation term is intended to ensure that the NB-IoT PRBs share the same physical layer definition as defined for the case of stand-alone and guard-band operation.

The Multefire Alliance (MFA) is finalizing the specifications for NB-IoT-Unlicensed (NB-IoT-U), which will allow for operation in unlicensed spectrum. In a first release, NB-IoT-U will be made available in the United States and in Europe, in the 800 and 900 megahertz (MHz) frequency bands.

In Europe, following the European Telecommunications Standards Institute (ETSI) regulations set forth in ETSI EN 300 220 v3.1.0, NB-IoT-U is designed as a single-PRB system. The operation in the MFA specifications follows the design known as frame structure type 3N2 (described in MFA TS 36.211 v1.1.1).

In the United States, NB-IoT complies with the Federal Communications Commission (FCC) regulations in § 15.247, "Operation within the bands 902-928 MHz, 2400-2483.5 MHz, and 5725-5850 MHz," of the Electronic Code of Federal Regulations. Part of the design follows the rules of a frequency-hopping system and reuses the NB-IoT system bandwidth of 1 PRB. Part of the design, however, follows the rules of digital modulation with a system bandwidth of 3 PRBs. The operation in the MFA specifications follows the design known as frame structure type 3N1. In the MFA TS 36.211 v1.1.1, the signal bandwidth is described as follows:

For MF NB-IoT, the transmitted signal on one antenna port in each slot is described by 1 or 3 resource block(s) as defined in clause 6.2.3:

If frame structure type 3N1 is used, $N_{RB}^{DL}$=3 for anchor segment and $N_{RB}^{DL}$=1 for data segment. The relation between the physical resource block number $n_{PRB}$ in the frequency domain and resource elements (k,l) in anchor segment is given by $$n_{PRB} = \left\lfloor \frac{k}{12} \right\rfloor,$$

where k=0, 1, 2, ..., $3N_{sc}^{RB}-1$. The anchor segment in the frequency domain is illustrated in FIG. 10.2.2.1-1.

If frame structure type 3N2 is used, $N_{RB}^{DL}=1$ for both anchor segment and data segment.

FIG. 1 illustrates the anchor segment for frame structure type 3N1 depicted in FIG. 10.2.2.1-1 of MFA TS 36.211 v1.1.1. More particularly, FIG. 1 illustrates three PRBs, denoted as $n_{PRB}\#0$, $n_{PRB}\#1$, and $n_{PRB}\#2$. Time (20 ms) is shown on the x-axis and frequency (in subcarriers) is shown on the y-axis. For $n_{PRB}\#0$, k=0 and for $n_{PRB}\#2$, $k=3N_{sc}^{RB}-1$. In the example of FIG. 1, $n_{PRB}\#0$ in the NB-IoT anchor segment carries the Narrowband Primary Synchronization Signal (NPSS), the Narrowband Secondary Synchronization Signal (NSSS), and the Narrowband Physical Broadcast Channel (NPBCH).

To generate the NB-IoT-U waveform, the MFA has agreed to use the NB-IoT baseband definition for stand-alone and guard-band deployments described in MFA TS 36.211 v1.1.1 as follows:

For an MF NB-IoT carrier, the time-continuous signal $s_l^{(p)}(t)$ on antenna port p in OFDM symbol l in a downlink slot is defined by $$s_l^{(p)}(t) = \sum_{k=-\lfloor N_{RB}^{DL}N_{sc}^{RB}/2 \rfloor}^{k=\lceil N_{RB}^{DL}N_{sc}^{RB}/2 \rceil - 1} a_{k^{(-)},l}^{(p)} \cdot e^{j2\pi(k+1/2)\Delta f(t-N_{CP,l}T_s)}$$

for $0 \le t < (N_{CP,l}+N) \times T_s$ where $k^{(-)} = k + \lfloor N_{RB}^{DL}N_{sc}^{RB}/2 \rfloor$, N=2048, $\Delta f$=15 kHz and $a_{k,l}^{(p)}$ is the content of resource element (k,l) on antenna port p.

An antenna port is defined such that the channel over which a symbol on the antenna port is conveyed can be inferred from the channel over which another symbol on the same antenna port is conveyed.

There currently exist certain challenges. For example, the NB-IoT-U baseband definition according to MFA TS 36.211 v1.1.1 does not implement the phase compensation term $\theta_{k,l}$. Consequently, the NB-IoT-U anchor segment PRBs 0, 1 and 2 in frame structure 3N1 will not provide an aligned physical layer waveform, as the OFDM symbol starting phase for each PRB will be dependent on the PRB number.

Moreover, the NB-IoT-U PRB #0 waveform will not be aligned across frame structure type 3N1 and 3N2. The consequence of this is that the NPSS, NSSS and NPBCH waveforms will be different in the United States (governed by the FCC regulations described above) and Europe (which follows the guidelines in ETSI described above).

Additionally, NB-IoT-U devices are of low complexity and are only required to be capable of receiving a single PRB. As the frame structure 3N1 anchor segment PRBs' waveform differs, an NB-IoT-U device will need to adapt its receiver algorithm based on the received PRB number. An NB-IoT-U device will also need to adapt its NPSS, NSSS and NPBCH receiver algorithm depending on the geographical location of the device. This is due to the difference in the waveforms mapped on PRB #0 between frame structures type 3N1 and 3N2.

Thus, the current baseband definition in MFA TS 36.211 goes against the NB-IoT design philosophy, which is that adaptation or compensation of the waveform definition should be implemented by the base station to allow for ultra-low device complexity. Contrary to this goal, the current approach will increase the NB-IoT-U device complexity and cost.

One possible alternative approach is to use the NB-IoT in-band baseband definition, as it would provide the needed phase compensation $\theta_{k,l}$. The NB-IoT in-band baseband definition, however, is adapted for LTE in-band operation and blanks the center DC sub-carrier. As described above, NB-IoT-U does not specify a DC sub-carrier. Thus, this is not a viable option.

SUMMARY

To address the foregoing problems with existing solutions, disclosed is a method performed by a network node in a wireless communications system. The method comprises generating a time-continuous baseband signal by applying a phase compensation that removes a PRB-dependent phase rotation on a subcarrier. The method comprises converting the generated time-continuous baseband signal into a radio frequency signal. The method comprises transmitting the radio frequency signal to a wireless device over a radio interface.

In certain embodiments, the time-continuous baseband signal transmitted on an antenna port p in an OFDM symbol l in a downlink slot may be defined as $s_l^{(p)}(t)$, and $$s_l^{(p)}(t) = \sum_{k=-\lfloor N_{RB}^{DL}N_{sc}^{RB}/2 \rfloor}^{k=\lceil N_{RB}^{DL}N_{sc}^{RB}/2 \rceil - 1} e^{\theta_{k,l}} \cdot a_{k^{(-)},l}^{(p)} \cdot e^{j2\pi(k+1/2)\Delta f(t-N_{CP,l}T_s)}$$

for $0 \le t < (N_{CP,l}+N) \times T_s$.

In certain embodiments, the phase compensation may be $\theta_{k,l}$. In certain embodiments, the phase compensation may have a periodicity of 7 OFDM symbols. In certain embodiments, one or more of the following may apply: $k^{(-)}=k+\lfloor N_{RB}^{DL}N_{sc}^{RB}/2 \rfloor$; N=2048; $\Delta f$=15 kHz; $a_{k,l}^{(p)}$ may be a content of a resource element (k,l) on the antenna port p; $\theta_{k,l}=j2\pi f_{NB-IoT}T_s(lN+\Sigma_{i=0}^{l}N_{CP,i})$; and $$f_{NB-IoT} = 180 \cdot 10^3 \cdot \left( \left\lfloor \frac{k^{(-)}}{12} \right\rfloor - \left\lfloor \frac{N_{RB}^{DL}}{2} \right\rfloor \right).$$

In certain embodiments, one or more of the following may apply: $N_{sc}^{RB}=12$; $N_{RB}^{DL}=3$ for a structure type 3N1 and $N_{RB}^{DL}=1$ for a structure type 3N2; $0 \le l \le 6$; $0 \le t \le (N_{CP,l}+N)T_s$; $N_{CP,l}=160$ for l=0 and otherwise $N_{CP,l}=144$; and $T_s=1/30.72 \cdot 10^6$.

In certain embodiments, the time-continuous baseband signal may be for an NB-IoT carrier. In certain embodiments, the wireless communications system may be NB-IoT. In certain embodiments, the radio frequency signal may be transmitted in unlicensed spectrum.

Also disclosed is a network node. The network node comprises a transmitter and processing circuitry coupled to the transmitter. The processing circuitry is configured to generate a time-continuous baseband signal by applying a phase compensation that removes a PRB-dependent phase rotation on a subcarrier. The processing circuitry is configured to convert the generated time-continuous baseband signal into a radio frequency signal. The processing circuitry is configured to transmit the radio frequency signal to a wireless device over a radio interface.

In certain embodiments, the time-continuous baseband signal on an antenna port p in an OFDM symbol i in a downlink slot may be defined as $s_i^{(p)}(t)$, and $$s_i^{(p)}(t) = \sum_{k=-\lfloor N_{RB}^{DL} N_{sc}^{RB}/2 \rfloor}^{k=\lceil N_{RB}^{DL} N_{sc}^{RB}/2 \rceil - 1} e^{\theta_{k,l}} \cdot a_{k(-),l}^{(p)} \cdot e^{j2\pi(k+1/2)\Delta f(t - N_{CP,l} T_s)}$$

for $0 \leq t < (N_{CP,l} + N) \times T_s$.

In certain embodiments, the phase compensation may be $\theta_{k,l}$. In certain embodiments, the phase compensation may have a periodicity of 7 OFDM symbols. In certain embodiments, one or more of the following may apply: $k^{(-)} = k + \lfloor N_{RB}^{DL} N_{sc}^{RB}/2 \rfloor$; N=2048; $\Delta f$=15 kHz; $a_{k,l}^{(p)}$ may be a content of a resource element (k,l) on the antenna port p; $\theta_{k,l} = j2\pi f_{NB-IoT} T_s (lN + \Sigma_{i=0}^{l} N_{CP,i})$; and $$f_{NB-IoT} = 180 \cdot 10^3 \cdot \left( \left\lfloor \frac{k^{(-)}}{12} \right\rfloor - \left\lfloor \frac{N_{RB}^{DL}}{2} \right\rfloor \right).$$

In certain embodiments, one or more of the following may apply: $N_{sc}^{RB}$=12; $N_{RB}^{DL}$=3 for a structure type 3N1 and $N_{RB}^{DL}$=1 for a structure type 3N2; $0 \leq l \leq 6$; $0 \leq t \leq (N_{CP,l}+N)T_s$; $N_{CP,l}$=160 for l=0 and otherwise $N_{CP,l}$=144; and $T_s$=1/30.72·10$^6$.

In certain embodiments, the time-continuous baseband signal may be for an NB-IoT carrier. In certain embodiments, the wireless communications system may be NB-IoT. In certain embodiments, the processing circuitry may be configured to transmit the radio frequency signal in unlicensed spectrum.

Also disclosed is a computer program, the computer program comprising instructions configured to perform a method. The method comprises generating a time-continuous baseband signal by applying a phase compensation that removes a PRB-dependent phase rotation on a subcarrier. The method comprises converting the generated time-continuous baseband signal into a radio frequency signal. The method comprises transmitting the radio frequency signal to a wireless device over a radio interface.

Also disclosed is a computer program product comprising a computer program, the computer program comprising instructions which when executed on a computer perform a method. The method comprises generating a time-continuous baseband signal by applying a phase compensation that removes a PRB-dependent phase rotation on a subcarrier. The method comprises converting the generated time-continuous baseband signal into a radio frequency signal. The method comprises transmitting the radio frequency signal to a wireless device over a radio interface.

Also disclosed is a non-transitory computer-readable storage medium comprising a computer program, the computer program comprising instruction which when executed on a computer perform a method. The method comprises generating a time-continuous baseband signal by applying a phase compensation that removes a PRB-dependent phase rotation on a subcarrier. The method comprises converting the generated time-continuous baseband signal into a radio frequency signal. The method comprises transmitting the radio frequency signal to a wireless device over a radio interface.

Certain embodiments of the present disclosure may provide one or more technical advantages. For example, certain embodiments may advantageously allow NB-IoT-U to follow the design principle of NB-IoT. As another example, certain embodiments may advantageously enable a user equipment (UE) to apply a unified receiver implementation across all PRBs and for all markets (e.g., United States and Europe). This may advantageously ensure that NB-IoT-U devices can be of ultra-low complexity and build on the NB-IoT baseband implementation. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 is a flowchart of a method implemented in a communication system, in accordance with certain embodiments; and FIG. 13 is a flowchart of a method implemented in a communication system, in accordance with certain embodiments.

DETAILED DESCRIPTION

Figure 1:
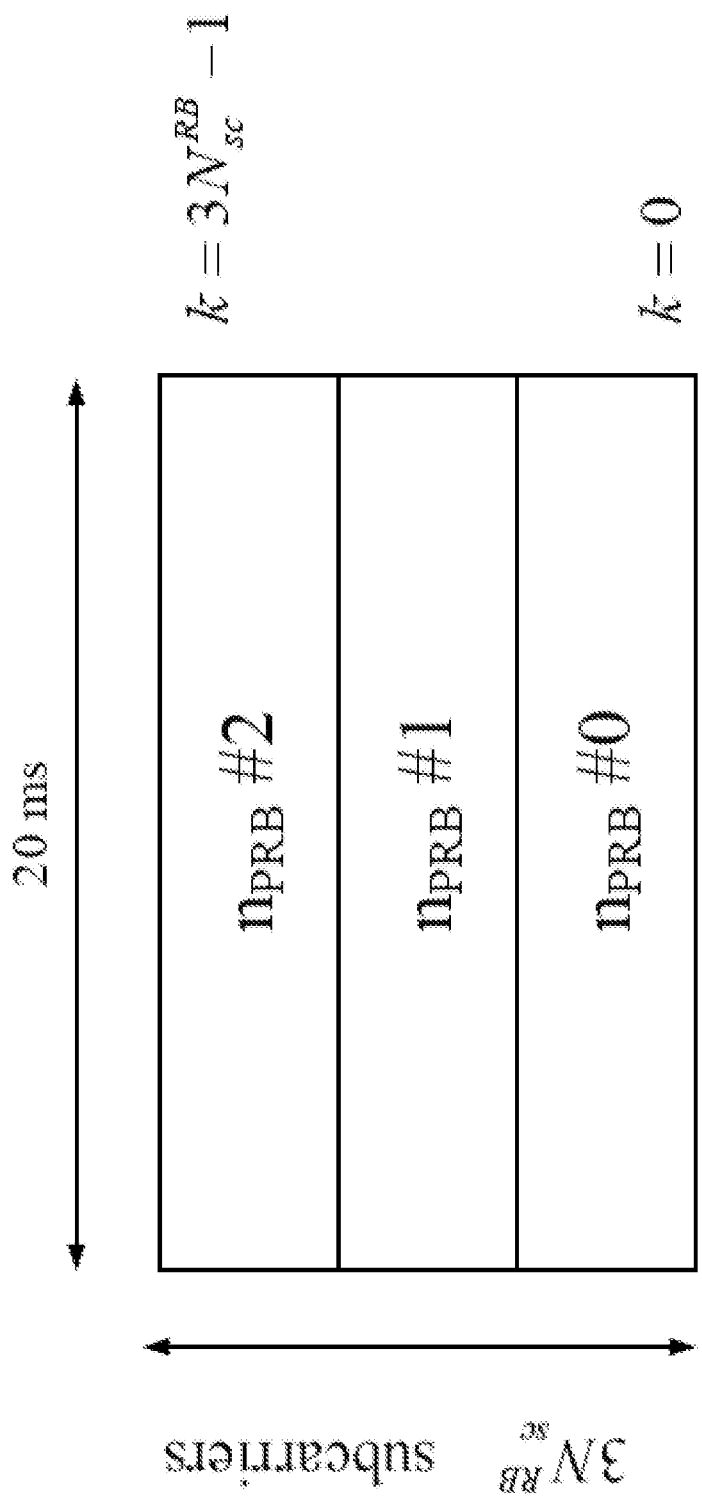
FIG. 1 illustrates the anchor segment for frame structure type 3N1 depicted in FIG. 10.2.2.1-1 of MFA TS 36.211 v1.1.1.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, the current NB-IoT-U baseband definition (described in MFA TS 36.211 v1.1.1) does not implement the phase compensation term $\theta_{k,l}$. This results in a number of negative consequences. As one example, the NB-IoT-U anchor segment PRBs 0, 1 and 2 in frame structure 3N1 will not provide an aligned physical layer waveform. As another example, the NB-IoT-U PRB #0 waveform will not be aligned across frame structure type 3N1 and 3N2 (which results in different waveforms for NPSS, NSSS, and NPBCH in the United States and Europe). This is problematic, as it would require an NB-IoT-U device (e.g., an NB-IoT-U UE) to adapt its receiver algorithm based on the received PRB number and also adapt its NPSS, NSSS and NPBCH receiver algorithm depending on the geographical location of the device.

The current baseband definition in MFA TS 36.211 thus goes against the NB-IoT design philosophy, which is that adaptation or compensation of the waveform definition should be implemented by the base station, not the UE, to allow for ultra-low device complexity. Contrary to this goal, the current approach increases the complexity and cost of NB-IoT-U devices.

As described above, one possible alternative approach is to use the NB-IoT in-band baseband definition, as it would provide the needed phase compensation $\theta_{k,l}$. The NB-IoT in-band baseband definition, however, is adapted for LTE in-band operation and blanks the center DC sub-carrier. This is not a viable option, however, because NB-IoT-U does not specify a DC sub-carrier.

The present disclosure contemplates various embodiments that may address these and other deficiencies associated with existing approaches. For example, in certain embodiments the NB-IoT-U baseband signal is defined based on the NB-IoT stand-alone baseband definition with the addition of a novel phase compensation term adapted for NB-IoT-U. Unlike existing approaches, this may advantageously provide an NB-IoT-U baseband definition that supports a unified waveform regardless of the NB-IoT-U PRB number or the region where NB-IoT-U is deployed.

According to one example embodiment, a method performed by a network node in a wireless communications system is disclosed. The network node generates a time-continuous baseband signal by applying a phase compensation that removes a PRB-dependent phase rotation on a subcarrier. The network node converts the generated time-continuous baseband signal into a radio frequency signal, and transmits the radio frequency signal to a wireless device (e.g., a UE) over a radio interface.

In certain embodiments, the time-continuous baseband signal transmitted on an antenna port p in an Orthogonal Frequency Division Multiplexing (OFDM) symbol Z in a downlink slot may be defined as $s_l^{(p)}(t)$, where:

$$s_l^{(p)}(t) = \sum_{k=-\lfloor N_{RB}^{DL} N_{sc}^{RB}/2 \rfloor}^{k=\lceil N_{RB}^{DL} N_{sc}^{RB}/2 \rceil - 1} e^{\theta_{k,l}} \cdot a_{k^{(-)},l}^{(p)} \cdot e^{j2\pi(k+1/2)\Delta f(t-N_{CP,l}T_s)}$$

for $0 \leq t < (N_{CP,l}+N) \times T_s$.

In certain embodiments, the phase compensation may be $\theta_{k,l}$. In certain embodiments, the phase compensation may have a periodicity of 7 OFDM symbols. In certain embodiments:

$k^{(-)} = k + \lfloor N_{RB}^{DL} N_{sc}^{RB}/2 \rfloor$;

$N = 2048$;

$\Delta f = 15$ kHz;

$a_{k,l}^{(p)}$ is content of a resource element (k,l) on the antenna port p;

$\theta_{k,l} = j2\pi f_{NB-IoT} T_s (lN + \Sigma_{i=0}^l N_{CP,i})$; and $$f_{NB-IoT} = 180 \cdot 10^3 \cdot \left( \left\lfloor \frac{k^{(-)}}{12} \right\rfloor - \left\lfloor \frac{N_{RB}^{DL}}{2} \right\rfloor \right).$$

In certain embodiments:

$N_{sc}^{RB} = 12$, $N_{RB}^{DL} = 3$ for a structure type 3N1 and $N_{RB}^{DL} = 1$ for a structure type 3N2;

$0 \leq l \leq 6$, $0 \leq t \leq (N_{CP,l}+N)T_s$, $N_{CP,l} = 160$ for $l = 0$ and otherwise $N_{CP,l} = 144$; and $T_s = 1/30.72 \cdot 10^6$.

In certain embodiments, the time-continuous baseband signal may be for a Narrowband Internet-of-Things (NB-IoT) carrier. In certain embodiments, the wireless communications system may be NB-IoT. In certain embodiments, the radio frequency signal is transmitted in unlicensed spectrum.

Certain embodiments may provide one or more technical advantages. For example, certain embodiments may advantageously allow NB-IoT-U to follow the design principle of NB-IoT. As another example, certain embodiments may advantageously enable a user equipment (UE) to apply a unified receiver implementation across all PRBs and for all markets (e.g., United States and Europe). This may advantageously ensure that NB-IoT-U devices can be of ultra-low complexity and build on the NB-IoT baseband implementation.

Other advantages may be readily apparent to one having skill in the art. Certain embodiments may have none, some, or all of the recited advantages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 2:
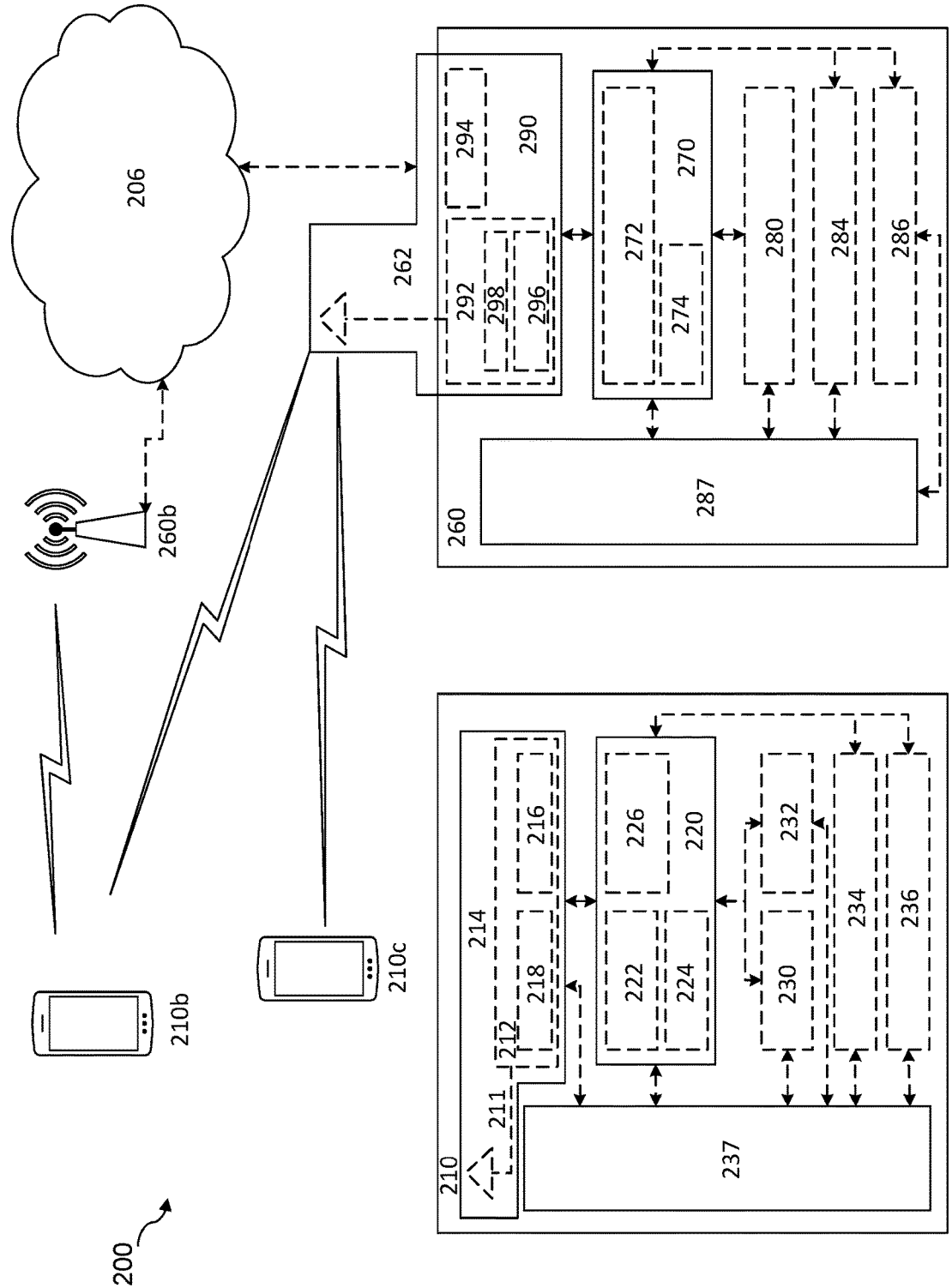
FIG. 2 illustrates an example wireless communications network, in accordance with certain embodiments.

FIG. 2 illustrates an example wireless communications network, in accordance with certain embodiments. Although the subject matter described herein may be implemented in any appropriate type of system using any suitable components, the embodiments disclosed herein are described in relation to a wireless network, such as the example wireless network 200 illustrated in FIG. 2. For simplicity, wireless network 200 of FIG. 2 only depicts network 206, network nodes 260 and 260b, and WDs 210, 210b, and 210c. In practice, wireless network 200 may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. Wireless network 200 may provide communication and other types of services to one or more wireless devices to facilitate the wireless devices' access to and/or use of the services provided by, or via, wireless network 200.

Wireless network 200 may comprise and/or interface with any type of communication, telecommunication, data, cellular, and/or radio network or other similar type of system. In some embodiments, wireless network 200 may be configured to operate according to specific standards or other types of predefined rules or procedures. Thus, particular embodiments of wireless network 200 may implement communication standards, such as NB-IoT, NB-IoT-U, Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in wireless network 200. In different embodiments, wireless network 200 may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in wireless network 200 to enable and/or provide wireless access to the wireless device and/or to perform other functions (e.g., administration) in wireless network 200. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to wireless network 200 or to provide some service to a wireless device that has accessed wireless network 200.

In FIG. 2, network node 260 includes processing circuitry 270, device readable medium 280, interface 290, auxiliary equipment 284, power source 286, power circuitry 287, and antenna 262. Although network node 260 illustrated in the example wireless network 200 of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple RATs. In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, NB-IoT, NB-IoT-U, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and wireless network 200 generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP NB-IoT and/or NB-IoT-U standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, NB-IoT, NB-IoT-U, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and wireless network 200 generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or wireless network 200, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

As described above, in certain embodiments wireless network 200 may be an NB-IoT and/or NB-IoT-U wireless communications system. Similarly, in certain embodiments WD 210 may be an NB-IoT and/or NB-IoT-U device. The current baseband definition in MFA TS 36.211 goes against the NB-IoT design philosophy, which is that adaptation or compensation of the waveform definition should be implemented by network nodes 260, not WD 210, to allow for ultra-low wireless device complexity. Contrary to this goal, the current approach increases the complexity and cost of NB-IoT-U devices. In particular, the current NB-IoT-U baseband definition (described in MFA TS 36.211 v1.1.1) does not implement the phase compensation term $\theta_{k,l'}$. As a result, the NB-IoT-U anchor segment PRBs 0, 1 and 2 in frame structure 3N1 will not provide an aligned physical layer waveform. Moreover, the NB-IoT-U PRB #0 waveform will not be aligned across frame structure type 3N1 and 3N2 (which results in different waveforms for NPSS, NSSS, and NPBCH in the United States and Europe). This is problematic, as it would require an NB-IoT-U device, e.g., WD 210, to adapt its receiver algorithm based on the received PRB number and also adapt its NPSS, NSSS and NPBCH receiver algorithm depending on the geographical location of WD 210.

The present disclosure contemplates various embodiments that may address these and other deficiencies associated with existing approaches. For example, in certain embodiments the NB-IoT-U baseband signal is defined based on the NB-IoT stand-alone baseband definition with the addition of a novel phase compensation term adapted for NB-IoT-U. Unlike existing approaches, this may advantageously provide an NB-IoT-U baseband definition that supports a unified waveform regardless of the NB-IoT-U PRB number or the region where NB-IoT-U is deployed.

According to one example embodiment, network node 260 generates a time-continuous baseband signal by applying a phase compensation that removes a PRB-dependent phase rotation on a subcarrier. The present disclosure contemplates a variety of ways for generating the time-continuous baseband signal by applying a phase compensation that removes the PRB-dependent phase rotation on the subcarrier, as described in more detail below. In certain embodiments, the time-continuous baseband signal is for an NB-IoT carrier.

Network node 260 converts the generated time-continuous baseband signal into a radio frequency signal, and transmits the radio frequency signal to WD 210 over a radio interface. In certain embodiments, the radio frequency signal may be transmitted in unlicensed spectrum (e.g., over the NB-IoT-U radio interface). The transmitted signal may be received by WD 210, and may carry any suitable information. For example, the transmitted signal may carry a synchronization signal (e.g., NPSS, NSSS and NPBCH). The transmitted signal may be a broadcast signal carrying, for example, a Master Information Block (MIB).

As described above, a variety of approaches may be used for generating the time-continuous baseband signal by applying a phase compensation that removes the PRB-dependent phase rotation on the subcarrier.

According to one example embodiment, the time-continuous NB-IoT-U baseband signal $s_{l'}^{(p)}(t)$ is defined based on the NB-IoT stand-alone baseband definition with the addition of the phase compensation term $\theta_{k,l'}$. This results in a definition of $s_{l'}^{(p)}(t)$ for antenna port p in OFDM symbol l' as follows:

$$s_{l'}^{(p)}(t) = \sum_{k=-\lfloor N_{RB}^{DL} N_{sc}^{RB}/2 \rfloor}^{k=\lceil N_{RB}^{DL} N_{sc}^{RB}/2 \rceil - 1} e^{\theta_{k,l'}} \cdot a_{k^{(-)},l'}^{(p)} \cdot e^{j2\pi(k+1/2)\Delta f \left(t - N_{CP,l'} \bmod N_{symb}^{DL} T_s\right)}$$

where:

$N_{sc}^{RB} = 12$, $N_{RB}^{DL} = 3$, for structure type 3N1 (FCC) and
$N_{RB}^{DL} = 1$, for structure type 3N2 (ETSI)

$k^{(-)} = k + \lfloor N_{RB}^{DL} N_{sc}^{RB}/2 \rfloor$, $l' = l + N_{symb}^{DL} (n_s \bmod 4)$, where $N_{symb}^{DL} = 7$ and $0 \le n_s \le 20$, $0 \le l \le 56$, $a_{k,l}^{(p)}$ being the content of resource element (k,l) on antenna port p, $\Delta f = 15$ kHz, $0 \le t < (N_{CP,l} + N) T_s$, $N = 2048$, $N_{CP,l} = 160$ for $l = 0$ and otherwise $N_{CP,l} = 144$, and $T_s = 1/30.72 \cdot 10^6$ In this example, the phase compensation term $\theta_{k,l'}$ is defined as:

$$\theta_{k,l'} = j 2\pi f_{NB-IoT} T_s \left( l'N + \sum_{i=0}^{l'} N_{CP, i \bmod 7} \right)$$

The quantity $f_{NB-IoT}$ equals the center frequency location of NB-IoT PRB $n_{PRB} = \lfloor k^{(-)}/12 \rfloor$ minus the center frequency location of the central NB-IoT-U PRB $n_{PRB,center} = \lfloor N_{RB}^{DL}/2 \rfloor$. Note that since $n_{PRB} - n_{PRB,center} \in \{-1, 0, 1\}$ the resulting frequency offset $f_{NB-IoT} \in \{-180, 0, 180\}$.

Certain embodiments aim to reuse the 3GPP definitions to the maximum extent possible. This includes the definition of the phase compensation, that is periodically repeating every 4 OFDM slots (every 28 OFDM symbols). However, considering the set of frequency offsets $f_{NB-IoT} \in \{-180, 0, 180\}$, it can be concluded that $B_{k,l'}$ repeats with a periodicity of a single slot (7 OFDM symbols).

Thus, according to a second example embodiment, the dependency on l' is removed, for example by defining l'=1.

This approach results in the following definition. For an MF NB-IoT carrier, the time-continuous signal $s_l^{(p)}(t)$ on antenna port p in OFDM symbol l in a downlink slot is defined by:

$$s_l^{(p)}(t) = \sum_{k=-\lfloor N_{RB}^{DL}N_{sc}^{RB}/2 \rfloor}^{k=\lceil N_{RB}^{DL}N_{sc}^{RB}/2 \rceil - 1} e^{\theta_{k,l}} \cdot a_{k^{(-)},l}^{(p)} \cdot e^{j2\pi(k+1/2)\Delta f(t-N_{CP,l}T_s)}$$

for $0 \leq t < (N_{CP,l}+N) \times T$. In the equation above, the phase compensation term is $\theta_{k,l}$, which, as described above, has a periodicity of 7 OFDM symbols. Additionally, in this second example embodiment $k^{(-)}=k+\lfloor N_{RB}^{DL}N_{sc}^{RB}/2 \rfloor$, N=2048, $\Delta f=15$ kHz, $a_{k,l}^{(p)}$ is the content of resource element (k,l) on the antenna port p, $\theta_{k,l}=j2\pi f_{NB-IoT}T_s(lN+\Sigma_{i=0}^l N_{CP,i})$, and the quantity $$f_{NB-IoT} = 180 \cdot 10^3 \cdot \left( \left\lfloor \frac{k^{(-)}}{12} \right\rfloor - \left\lfloor \frac{N_{RB}^{DL}}{2} \right\rfloor \right).$$

Furthermore, in this second example embodiment $N_{sc}^{RB}=12$, $N_{RB}^{DL}=3$ for a structure type 3N1 and $N_{RB}^{DL}=1$ for a structure type 3N2, $0<l\leq 6$, $0\leq t\leq (N_{CP,l}+N)T_s$, $N_{CP,l}=160$ for l=0 and otherwise $N_{CP,l}=144$, and $T_s=1/30.72\cdot 10^6$.

The approaches described above may advantageously allow NB-IoT-U to follow the design principle of NB-IoT. With the above-described approaches the NB-IoT-U anchor segment PRBs 0, 1 and 2 in frame structure 3N1 provide an aligned physical layer waveform (as described in more detail below in relation to FIGS. 3A and 3B) and, importantly, the NB-IoT-U PRB #0 waveform is aligned across frame structure type 3N1 and 3N2. Advantageously, with the above-described approaches an NB-IoT-U device, e.g., WD 210, will no longer need to adapt its receiver algorithm based on the received PRB number or adapt its NPSS, NSSS and NPBCH receiver algorithm depending on the geographical location of WD 210. This allows WD 210 to apply a unified receiver implementation across all PRBs and for all markets (e.g., United States and Europe), reducing the need for complexity in WD 210 consistent with NB-IoT design principles.

Figure 3B:
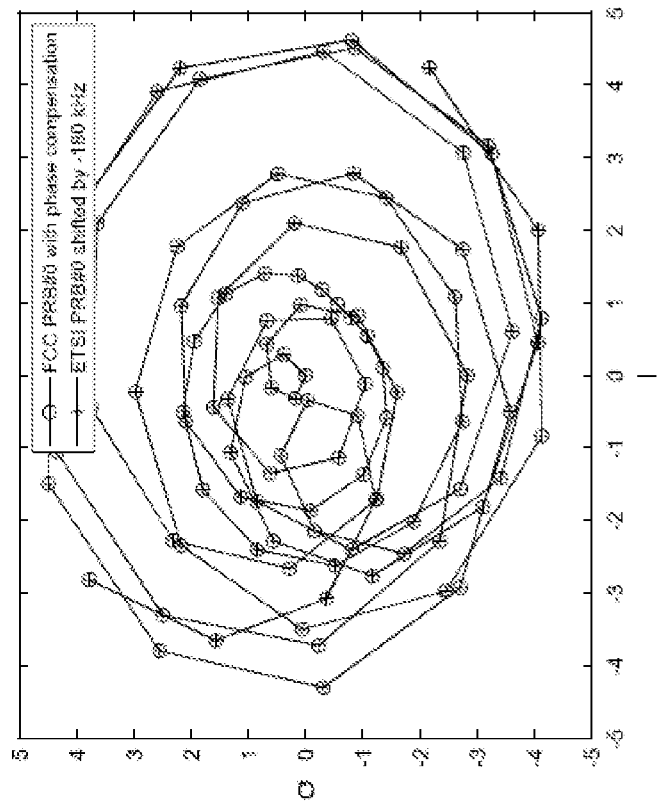
FIG. 3B illustrates an IQ trace for each of the FCC PRB #0 and ETSI PRB #0, with phase compensation applied, in accordance with certain embodiments.
Figure 3A:
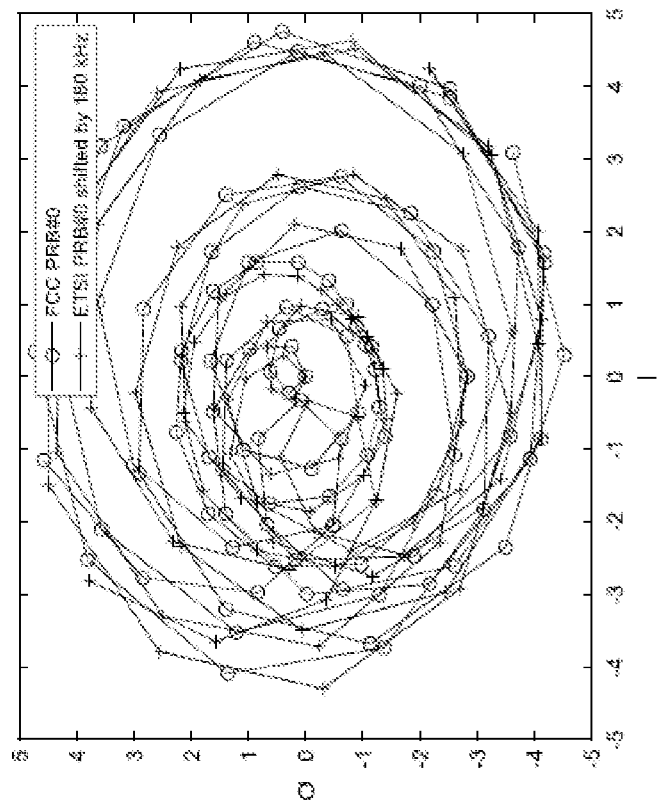
FIG. 3A illustrates an inphase and quadrature (IQ) trace for each of the FCC PRB #0 and ETSI PRB #0, shifted by −180 kHz.

FIGS. 3A and 3B illustrate IQ traces for each of the FCC PRB #0 and ETSI PRB #0, shifted by −180 degrees. For each of FIGS. 3A and 3B, 100 samples were plotted using a sample rate of 1.92 MHz.

FIG. 3A illustrates an IQ trace for each of the FCC PRB #0 and ETSI PRB #0, shifted by −180 kHz. As described above, NB-IoT-U will be made available in the United States and Europe in accordance with FCC and ETSI regulations, respectively. NB-IoT-U in the United States will follow the design of frame structure type 3N1, while operation in Europe will follow the design of frame structure 3N2. With existing approaches, the NB-IoT-U anchor segment PRBs 0, 1 and 2 in frame structure 3N1 will not provide an aligned physical layer waveform, as the OFDM symbol starting phase for each PRB will be dependent on the PRB number. In particular, the NB-IoT-U PRB #0 waveform will not be aligned across frame structure type 3N1 and 3N2.

An example of this is shown in FIG. 3A. As can be seen from FIG. 3A, the traces do not align. As a consequence, the NPSS, NSSS and NPBCH waveforms will be different in the United States and Europe.

FIG. 3B illustrates an IQ trace for each of the FCC PRB #0 and ETSI PRB #0, with phase compensation applied, in accordance with certain embodiments. When the time-continuous baseband signal is generated by applying a phase compensation that removes the PRB-dependent phase rotation on a subcarrier as described above in relation to FIG. 2, the traces align perfectly (as shown in FIG. 3B). As the waveforms are now aligned, it is no longer necessary for an NB-IoT-U device to adapt its receiver algorithm based on the received PRB number or the geographical location of the device due to the difference in the waveforms mapped on PRB #0 between frame structures type 3N1 and 3N2.

Figure 4:
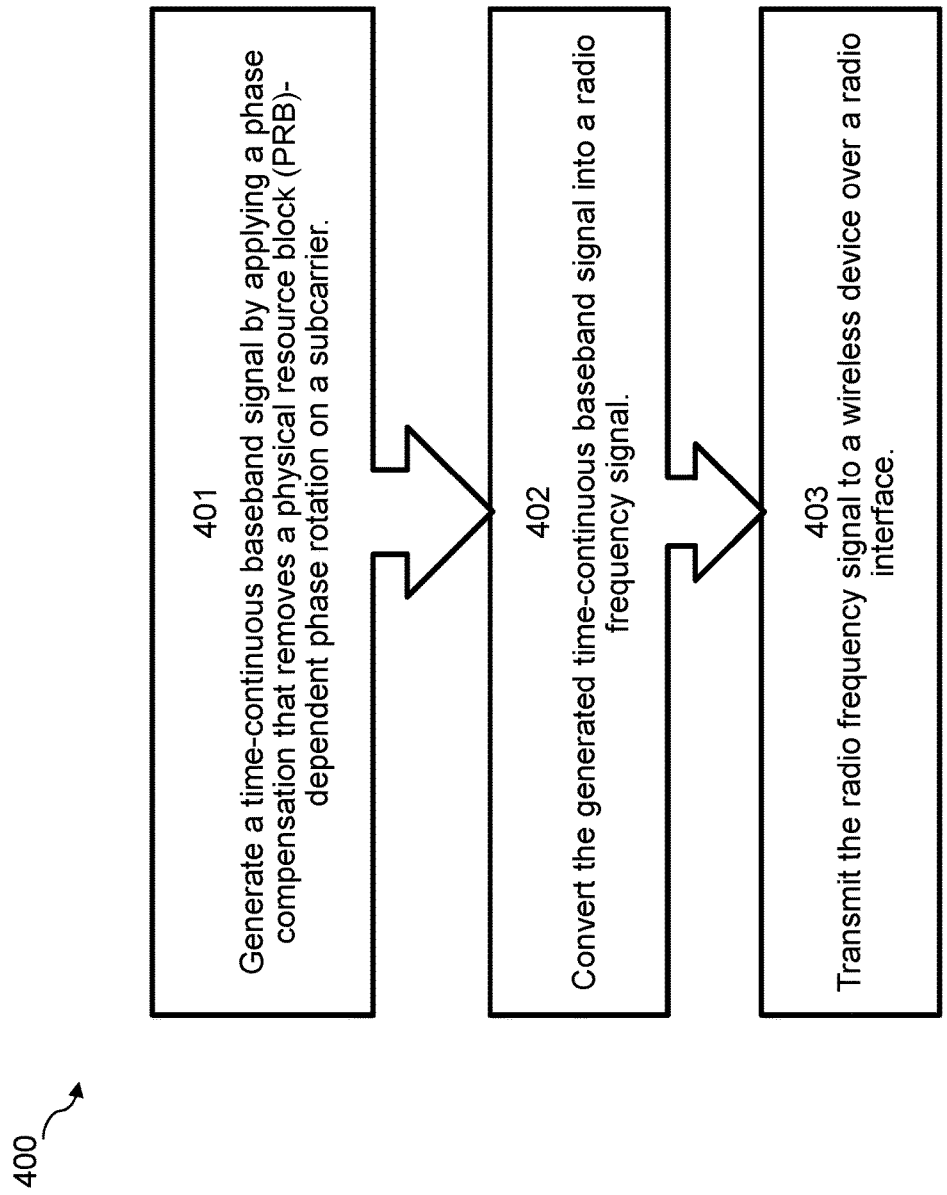
FIG. 4 is a flowchart of a method in a network node, in accordance with certain embodiments.

FIG. 4 is a flowchart of a method in a network node, in accordance with certain embodiments. More particularly, FIG. 4 is a flowchart of a method 400 performed by a network node in a wireless communications system. In certain embodiments, the wireless communications system may be NB-IoT.

Method 400 begins at step 401, where the network node generates a time-continuous baseband signal by applying a phase compensation that removes a PRB-dependent phase rotation on a subcarrier. In certain embodiments, the time-continuous baseband signal may be for an NB-IoT carrier.

At step 402, the network node converts the generated time-continuous baseband signal into a radio frequency signal. At step 403, the network node transmits the radio frequency signal to a wireless device over a radio interface. In certain embodiments, the radio frequency signal may be transmitted in unlicensed spectrum.

In certain embodiments, the time-continuous baseband signal transmitted on an antenna port p in an OFDM symbol i in a downlink slot may be defined as $s_l^{(p)}(t)$, and $$s_l^{(p)}(t) = \sum_{k=-\lfloor N_{RB}^{DL}N_{sc}^{RB}/2 \rfloor}^{k=\lceil N_{RB}^{DL}N_{sc}^{RB}/2 \rceil - 1} e^{\theta_{k,l}} \cdot a_{k^{(-)},l}^{(p)} \cdot e^{j2\pi(k+1/2)\Delta f(t-N_{CP,l}T_s)}$$

for $0 \leq t < (N_{CP,l}+N) \times T_s$.

In certain embodiments, the phase compensation may be $\theta_{k,l}$. In certain embodiments, the phase compensation may have a periodicity of 7 OFDM symbols. In certain embodiments, one or more of the following may apply: $k^{(-)}=k+\lfloor N_{RB}^{DL}N_{sc}^{RB}/2 \rfloor$; N=2048; $\Delta f=15$ kHz; $a_{k,l}^{(p)}$ may be a content of a resource element (k,l) on the antenna port p; $\theta_{k,l}=j2\pi f_{NB-IoT}T_s(lN+\Sigma_{i=0}^l N_{CP,i})$ and $$f_{NB-IoT} = 180 \cdot 10^3 \cdot \left( \left\lfloor \frac{k^{(-)}}{12} \right\rfloor - \left\lfloor \frac{N_{RB}^{DL}}{2} \right\rfloor \right).$$

In certain embodiments, one or more of the following may apply: $N_{sc}^{RB}=12$; $N_{RB}^{DL}=3$ for a structure type 3N1 and $N_{RB}^{DL}=1$ for a structure type 3N2; $0\leq l\leq 6$; $0\leq t\leq (N_{CP,l}+N)T_s$; $N_{CP,l}=160$ for l=0 and otherwise $N_{CP,l}=144$; and $T_s=1/30.72\cdot 10^6$.

Figure 5:
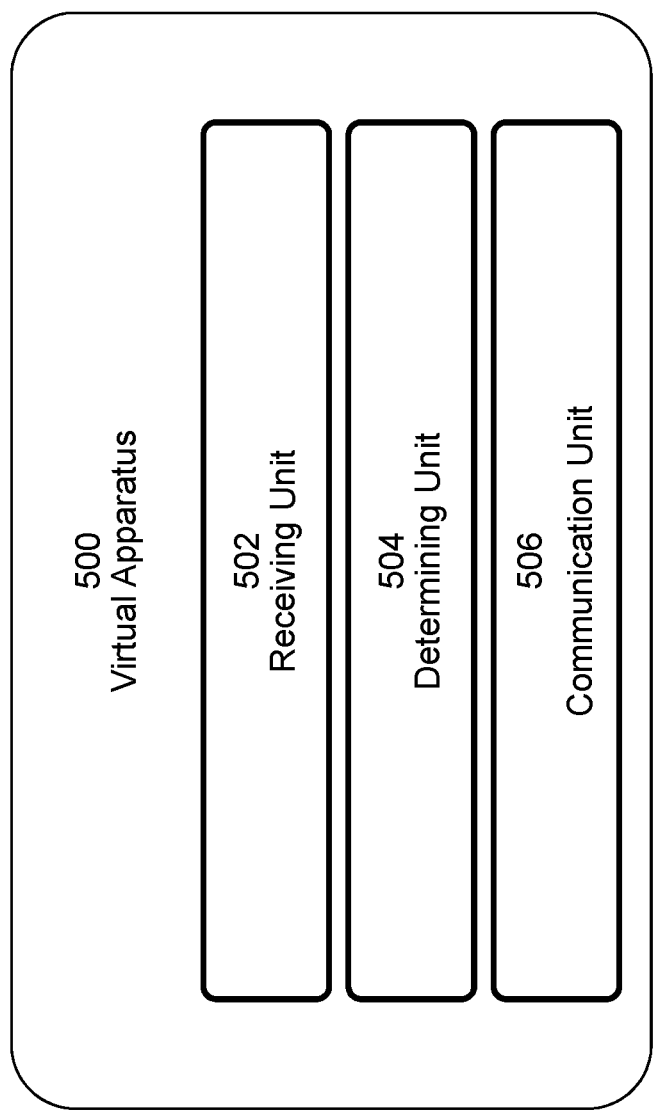
FIG. 5 is a schematic block diagram of a virtualization apparatus, in accordance with certain embodiments.

FIG. 5 is a schematic block diagram of a virtualization apparatus, in accordance with certain embodiments. More particularly, FIG. 5 illustrates a schematic block diagram of an apparatus 500 in a wireless network (for example, wireless network 200 shown in FIG. 2). The apparatus may be implemented in a network node (e.g., network node 260 shown in FIG. 2). Apparatus 500 is operable to carry out the example method described with reference to FIG. 4 above and possibly any other processes or methods disclosed herein. It is also to be understood that the method of FIG. 4 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 502, determining unit 504, communication unit 506, and any other suitable units of apparatus 500 to perform corresponding functions according one or more embodiments of the present disclosure.

As illustrated in FIG. 5, apparatus 500 includes receiving unit 502, determining unit 504, and communication unit 506. Receiving unit 502 may be configured to perform the receiving functions of apparatus 500. For example, receiving unit 502 may be configured to receive any suitable information (e.g., from a wireless device or another network node). Receiving unit 502 may include a receiver and/or a transceiver. Receiving unit 502 may include circuitry configured to receive messages and/or signals (wireless or wired). In particular embodiments, receiving unit 502 may communicate received messages and/or signals to determining unit 504 and/or any other suitable unit of apparatus 500. The functions of receiving unit 502 may, in certain embodiments, be performed in one or more distinct units.

Determining unit 504 may perform the processing functions of apparatus 500. In certain embodiments, determining unit 504 may be configured to define a time-continuous NB-IoT-U baseband signal comprising a phase compensation term adapted for NB-IoT-U. For example, determining unit 504 may be configured to generate a time-continuous baseband signal by applying a phase compensation that removes a PRB-dependent phase rotation on a subcarrier. In certain embodiments, determining unit 504 may be configured to generate the time-continuous baseband signal by applying a phase compensation that removes a PRB-dependent phase rotation on a subcarrier as described above in relation to FIGS. 2 and 3. Determining unit 504 may be configured to convert the generated time-continuous baseband signal into a radio frequency signal.

Determining unit 504 may include or be included in processing circuitry. Determining unit 504 may include analog and/or digital circuitry configured to perform any of the functions of determining unit 504 and/or processing circuitry described above. The functions of determining unit 504 may, in certain embodiments, be performed in one or more distinct units.

Communication unit 506 may be configured to perform the transmission functions of apparatus 500. For example, communication unit 506 may be configured to transmit messages or signals (e.g., to a wireless device and/or a network node). For example, communication unit 506 may be configured to transmit the radio frequency signal to a wireless device over a radio interface. In certain embodiments, communication unit 506 may be configured to transmit the radio frequency signal in unlicensed spectrum.

Communication unit 506 may include a transmitter and/or a transceiver. Communication unit 506 may include circuitry configured to transmit messages and/or signals (e.g., through wireless or wired means). In particular embodiments, communication unit 506 may receive messages and/or signals for transmission from determining unit 504 or any other unit of apparatus 500. The functions of communication unit 504 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 6:
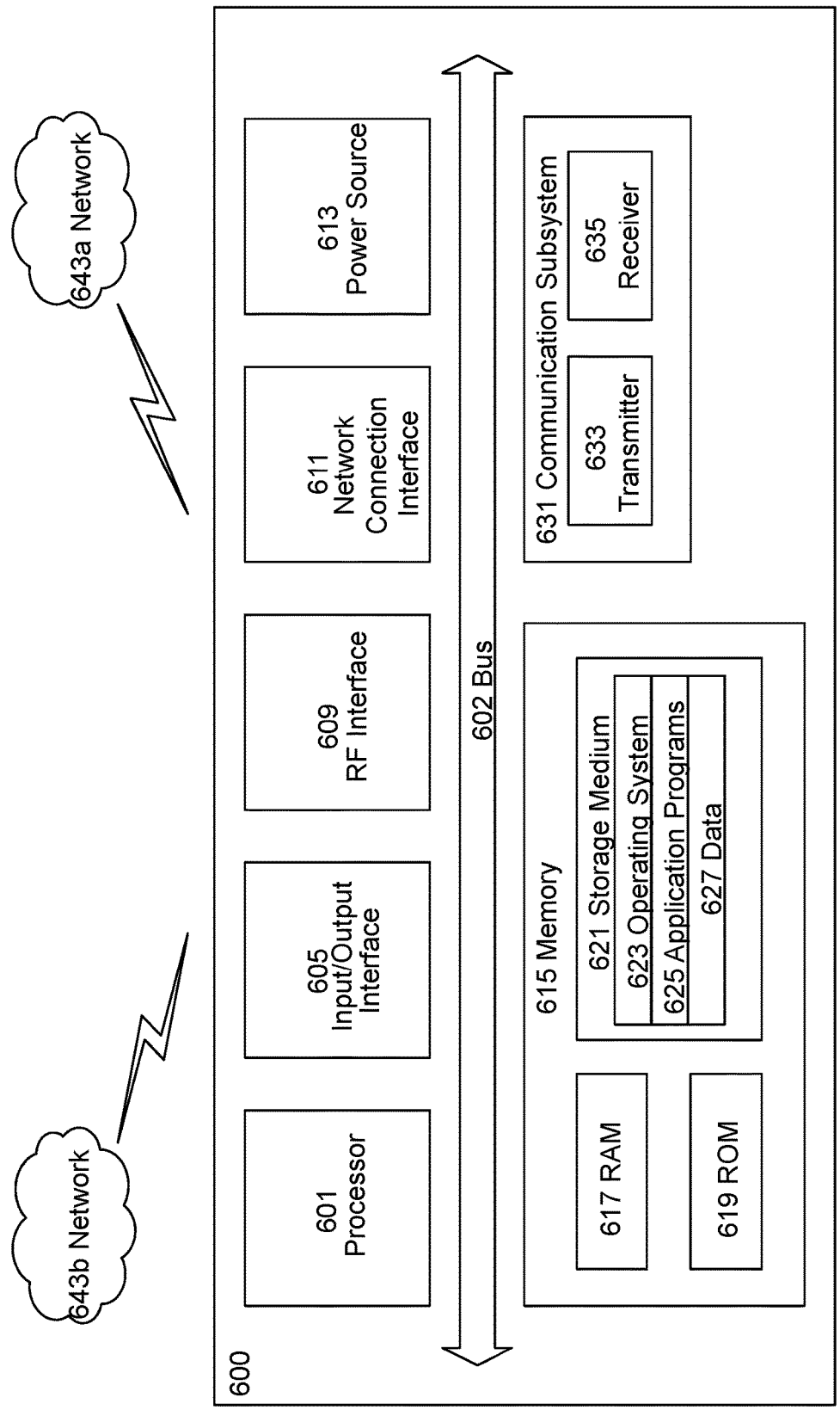
FIG. 6 illustrates one embodiment of a UE, in accordance with certain embodiments.

FIG. 6 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 600 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer. In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
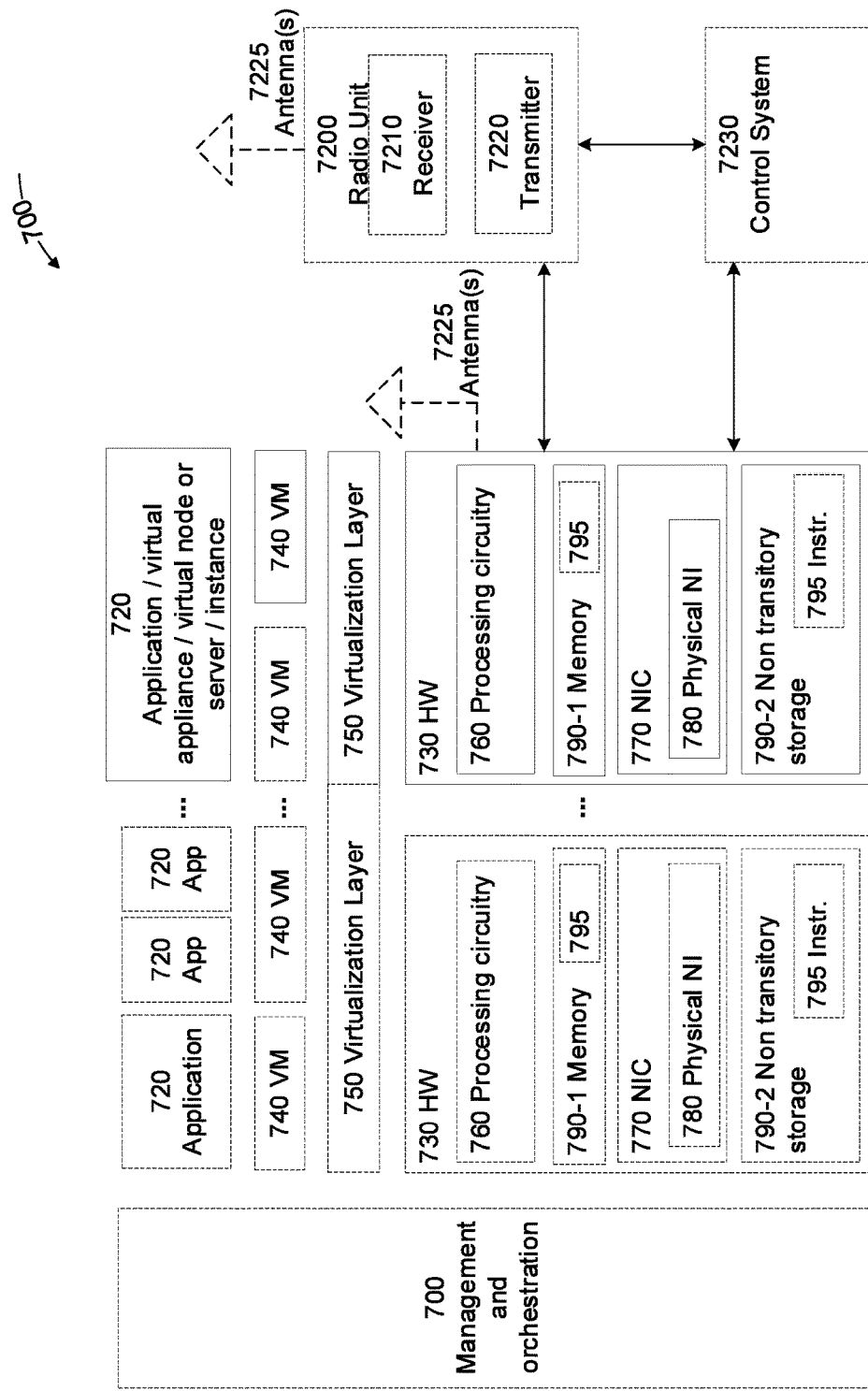
FIG. 7 is a schematic block diagram illustrating a virtualization environment, in accordance with certain embodiments.

FIG. 7 is a schematic block diagram illustrating a virtualization environment, in accordance with certain embodiments. More particularly, FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
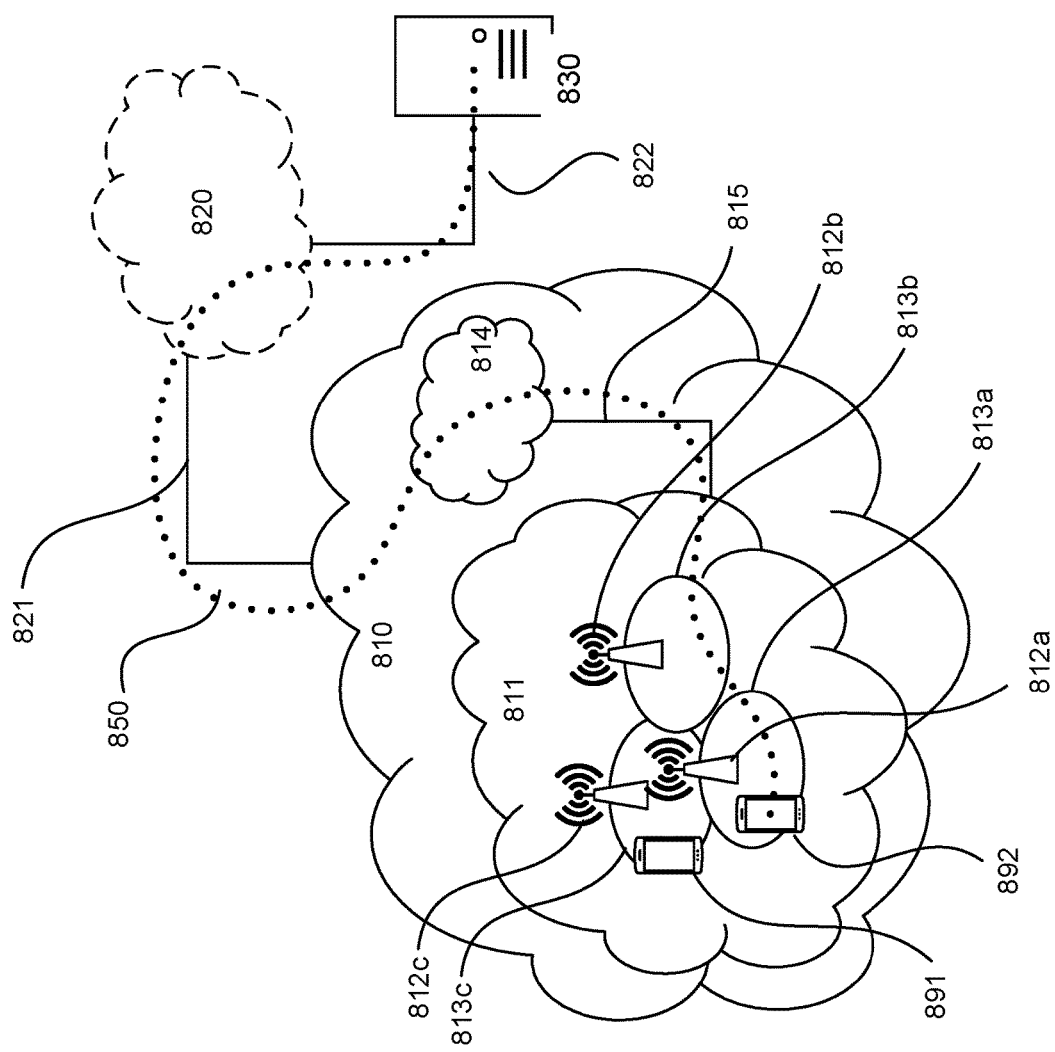
FIG. 8 illustrates an example telecommunication network connected via an intermediate network to a host computer, in accordance with certain embodiments.

FIG. 8 illustrates an example telecommunication network connected via an intermediate network to a host computer, in accordance with certain embodiments. With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
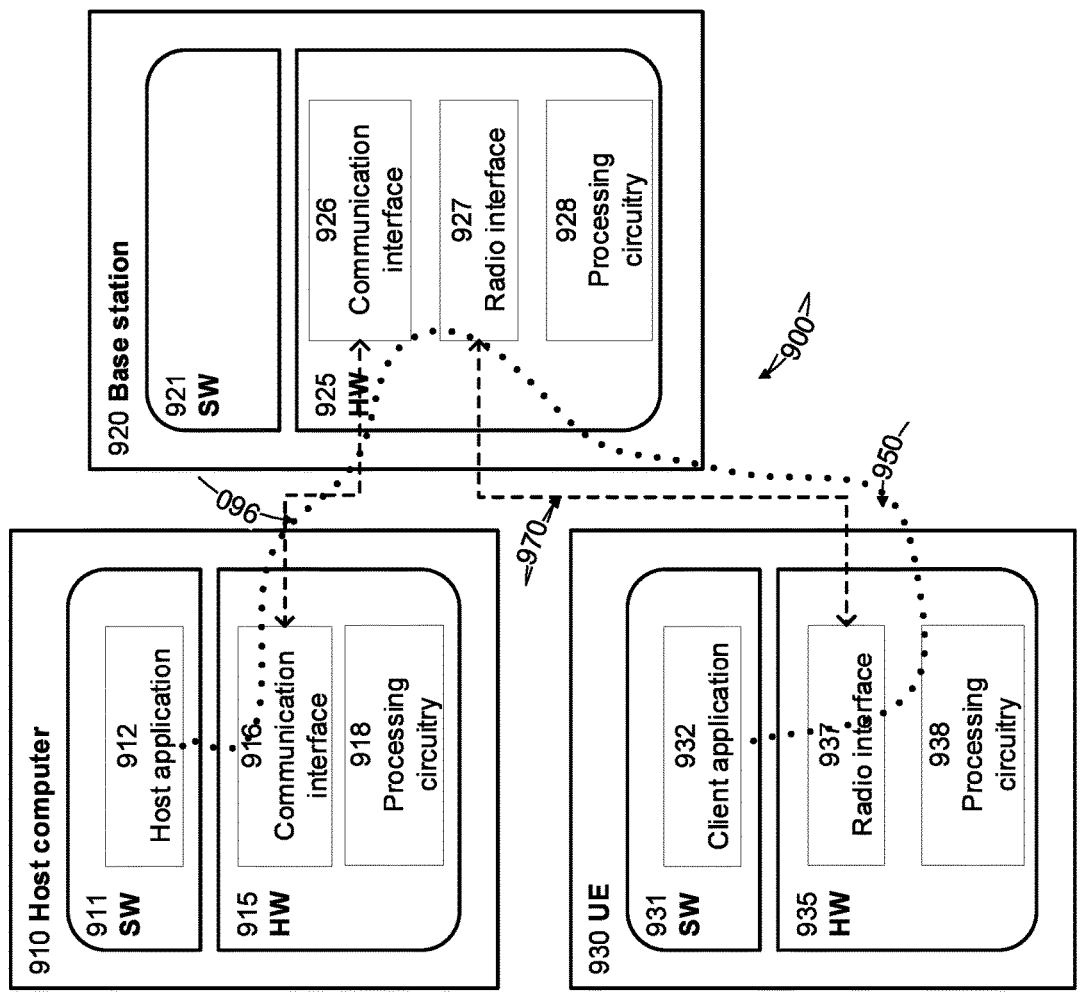
FIG. 9 illustrates an example of a host computer communicating via a base station with a UE over a partially wireless connection, in accordance with certain embodiments.

FIG. 9 illustrates an example of a host computer communicating via a base station with a UE over a partially wireless connection, in accordance with certain embodiments. Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
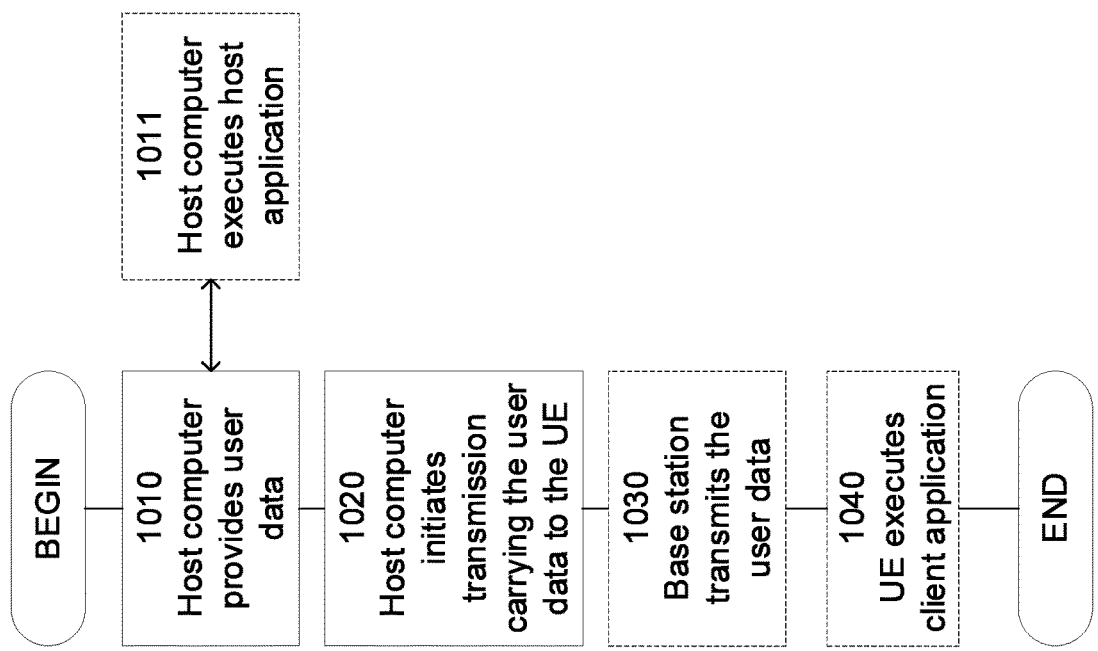
FIG. 10 is a flowchart of a method implemented in a communication system, in accordance with certain embodiments.

FIG. 10 is a flowchart of a method implemented in a communication system, in accordance with certain embodiments. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
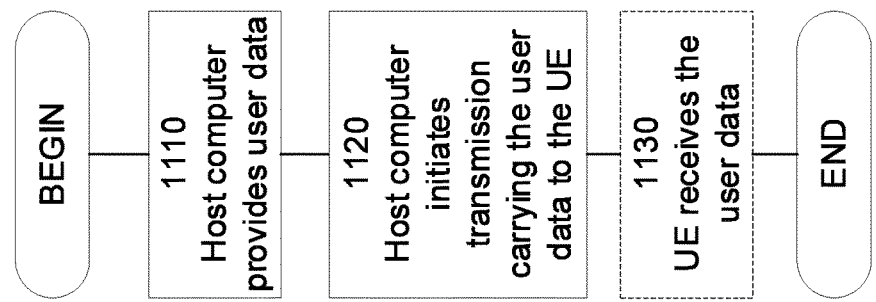
FIG. 11 is a flowchart of a method implemented in a communication system, in accordance with certain embodiments.

FIG. 11 is a flowchart of a method implemented in a communication system, in accordance with certain embodiments. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

FIG. 12 is a flowchart of a method implemented in a communication system, in accordance with certain embodiments. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart of a method implemented in a communication system, in accordance with certain embodiments. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FCC Federal Communications Commission
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MFA Multefire Alliance
MIB Master Information Block
MME Mobility Management Entity
MSC Mobile Switching Center
NB-IoT Narrowband Internet of Things
NB-IoT-U NB-IoT Unlicensed
NPBCH Narrowband Physical Broadcast Channel
NPDCCH Narrowband Physical Downlink Control Channel
NPSS Narrowband Primary Synchronization Signal
NR New Radio
NSSS Narrowband Secondary Synchronization Signal
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a network node in a wireless communications system, the method comprising:
generating a time-continuous baseband signal by applying a phase compensation that removes a physical resource block (PRB)-dependent phase rotation on a subcarrier, wherein the phase rotation is further dependent on a selected frame structure type for which the time-continuous baseband signal is generated;
converting the generated time-continuous baseband signal into a radio frequency signal; and
transmitting the radio frequency signal to a wireless device over a radio interface.

2. The method of claim 1, wherein:
the time-continuous baseband signal transmitted on an antenna port p in an Orthogonal Frequency Division Multiplexing (OFDM) symbol l in a downlink slot is defined as $s_l^{(p)}(t)$; and $$s_l^{(p)}(t) = \sum_{k=-\lfloor N_{RB}^{DL} N_{sc}^{RB}/2 \rfloor}^{k=\lceil N_{RB}^{DL} N_{sc}^{RB}/2 \rceil - 1} e^{\theta_{k,l}} \cdot a_{k^{(-)},l}^{(p)} \cdot e^{j2\pi(k+1/2)\Delta f(t-N_{CP,l}T_s)}$$

for $0 \leq t < (N_{CP,l}+N) \times T_s$.
wherein $N_{RB}^{DL}$ is a number of resource blocks in downlink, $N_{sc}^{RB}$ is a number of subcarriers, (k,l) is a resource element, DL is download, SC is subcarriers, $a_{k,l}^{(p)}$ is the content of resource element (k, l) on antenna port p, t is time, CP is cyclic prefix, $\Delta f$ is subcarrier bandwidth, N is a number, and $\theta_{k,l}$ is a phase compensation term.

3. The method of claim 1, wherein the phase compensation is $\theta_{k,l}$.

4. The method of claim 1, wherein the phase compensation has a periodicity of 7 OFDM symbols.

5. The method of claim 2, wherein:

$k^{(-)} = k + \lfloor N_{RB}^{DL} N_{sc}^{RB}/2 \rfloor$;

$N=2048$;

$\Delta f=15$ kHz;

$a_{k,l}^{(p)}$ is content of a resource element (k,l) on the antenna port p;

$\theta_{k,l} = j2\pi f_{NB-IoT} T_s (lN + \Sigma_{i=0}^{l} N_{CP,i})$; and $$f_{NB-IoT} = 180 \cdot 10^3 \cdot \left( \left\lfloor \frac{k^{(-)}}{12} \right\rfloor - \left\lfloor \frac{N_{RB}^{DL}}{2} \right\rfloor \right).$$

6. The method of claim 2, wherein:

$N_{sc}^{RB}=12$, $N_{RB}^{DL}=3$ for a structure type 3N1 and $N_{RB}^{DL}=1$ for a structure type 3N2;

$0 \leq l \leq 6$, $0 \leq t \leq (N_{CP,l}+N)T_s$, $N_{CP,l}=160$ for $l=0$ and otherwise $N_{CP,l}=144$; and $T_s = 1/30.72 \cdot 10^6$.

7. The method of claim 1, wherein the time-continuous baseband signal is for a Narrowband Internet-of-Things (NB-IoT) carrier.

8. The method of claim 1, wherein the wireless communications system is NB-IoT.

9. The method of claim 1, wherein the radio frequency signal is transmitted in unlicensed spectrum.

10. A network node, comprising:
a transmitter; and
processing circuitry coupled to the transmitter, the processing circuitry configured to:
generate a time-continuous baseband signal by applying a phase compensation that removes a physical resource block (PRB)-dependent phase rotation on a subcarrier, wherein the phase rotation is further dependent on a selected frame structure type for which the time-continuous baseband signal is generated;
convert the generated time-continuous baseband signal into a radio frequency signal; and
transmit the radio frequency signal to a wireless device over a radio interface.

11. The network node of claim 10, wherein:
the time-continuous baseband signal transmitted on an antenna port p in an Orthogonal Frequency Division Multiplexing (OFDM) symbol l in a downlink slot is defined as $s_l^{(p)}(t)$; and $$s_l^{(p)}(t) = \sum_{k=-\lfloor N_{RB}^{DL} N_{sc}^{RB}/2 \rfloor}^{k=\lceil N_{RB}^{DL} N_{sc}^{RB}/2 \rceil - 1} e^{\theta_{k,l}} \cdot a_{k^{(-)},l}^{(p)} \cdot e^{j2\pi(k+1/2)\Delta f(t-N_{CP,l}T_s)}$$

for $0 \leq t < (N_{CP,l}+N) \times T_s$.
wherein $N_{RB}^{DL}$ is a number of resource blocks in downlink, $N_{sc}^{RB}$ is a number of subcarriers, (k,l) is a resource element, DL is download, SC is subcarriers, $a_{k,l}^{(p)}$ is the content of resource element (k, l) on antenna port p, t is time, CP is cyclic prefix, $\Delta f$ is subcarrier bandwidth, N is a number, and $\theta_{k,l}$ is a phase compensation term.

12. The network code of claim 10, wherein the phase compensation is $\theta_{k,l}$.

13. The network node of claim 10, wherein the phase compensation has a periodicity of 7 OFDM symbols.

14. The network node of claim 11, wherein:

$k^{(-)} = k + \lfloor N_{RB}^{DL} N_{sc}^{RB}/2 \rfloor$;

$N=2048$;

$\Delta f=15$ kHz;

$a_{k,l}^{(p)}$ is content of a resource element (k,l) on the antenna port p;

$\theta_{k,l}=j2\pi f_{NB-IoT}T_s(lN+\Sigma_{i=0}^{i}N_{CP,i})$; and $$f_{NB-IoT} = 180 \cdot 10^3 \cdot \left(\left\lfloor \frac{k^{(-)}}{12} \right\rfloor - \left\lfloor \frac{N_{RB}^{DL}}{2} \right\rfloor\right).$$

15. The network node of claim 11, wherein:

$N_{sc}^{RB}=12$, $N_{RB}^{DL}=3$ for a structure type 3N1 and $N_{RB}^{DL}=1$ for a structure type 3N2;

$0 \le l \le 6$, $0 \le t \le (N_{CP,l}+N)T_s$, $N_{CP,l}=160$ for $l=0$ and otherwise $N_{CP,l}=144$; and $T_s=1/30.72\cdot 10^6$.

16. The network node of claim 10, wherein the time-continuous baseband signal is for a Narrowband Internet-of-Things (NB-IoT) carrier.

17. The network node of claim 10, wherein the wireless communications system is NB-IoT.

18. The network node of claim 10, wherein the processing circuitry is configured to transmit the radio frequency signal in unlicensed spectrum.

* * * * *

UNITED STATES PATENT AND TRADEMARK OFFICE
CERTIFICATE OF CORRECTION

PATENT NO. : 11,621,878 B2
APPLICATION NO. : 16/462105
DATED : April 4, 2023
INVENTOR(S) : Liberg et al.

Page 1 of 5

It is certified that error appears in the above-identified patent and that said Letters Patent is hereby corrected as shown below:

In the Specification

In Column 1, Lines 30-34, delete "This narrow . . . . . carrier." and insert the same at Line 29, after "(PRB)." as a continuation paragraph.

In Column 1, Line 41, delete "antenna port P" and insert -- antenna port p --, therefor.

In Column 1, Line 43, delete "downlink slot is defined by" and insert the same at Line 42, after "in a" as a continuation paragraph.

In Column 1, Line 51, delete "$0 \leq t < (N_{CP,l}+N) \times T_s$," and insert -- $0 \leq t < (N_{CP,l}+N) \times T_s$ --, therefor.

In Column 1, Lines 53-54, delete "is the content of resource element (k,l) on antenna port p, where $N_{sc}^{RB}=12$." and insert the same at Line 52, after "$a_{k,l}^{(p)}$" as a continuation paragraph.

In Column 1, Lines 66-67 delete "where $l'=l+N_{symb}^{DL}(n_s \bmod 4) \in \{0, \ldots, 27\}$ is the OFDM symbol index from the start" and insert the same at Line 65, after "symbol l'," as a continuation paragraph.

In Column 2, Line 1, delete "of the last even-numbered subframe, is defined by" and insert the same at Column 1, Line 67, after "start" as a continuation paragraph.

In Column 2, Line 30, delete "$\theta_{k,l}$." and insert -- $\theta_{k,l'}$. --, therefor.

In Column 3, Line 27, delete "p in OFDM symbol l in a downlink slot is defined by" and insert the same at Line 26, after "port" as a continuation paragraph.

In Column 3, Lines 37-38, delete "and $a_{k,l}^{(p)}$ is the content of resource element (k,l) on antenna port p." and insert the same at Line 36, after "$\Delta f=15$ kHz" as a continuation paragraph.

In Column 3, Line 45, delete "$\theta_{k,l}$." and insert -- $\theta_{k,l'}$. --, therefor.

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,621,878 B2

In Column 4, Line 8, delete "$\theta_{k,l}$." and insert -- $\theta_{k,l'}$. --, therefor.

In Column 4, Lines 32-34, delete

"$$s_l^{(p)}(t) = \sum_{k=-\lfloor N_{RB}^{DL} N_{sc}^{RB}/2 \rfloor}^{k=\lfloor N_{RB}^{DL} N_{sc}^{RB}/2 \rfloor - 1} e^{\theta_{k,l}} \cdot a_{k(-),l}^{(p)} \cdot e^{j2\pi(k+1/2)\Delta f(t - N_{CP,l}T_s)}$$"

and insert $$s_l^{(p)}(t) = \sum_{k=-\lfloor N_{RB}^{DL} N_{sc}^{RB}/2 \rfloor}^{k=\lceil N_{RB}^{DL} N_{sc}^{RB}/2 \rceil - 1} e^{\theta_{k,l}} \cdot a_{k(-),l}^{(p)} \cdot e^{j2\pi(k+1/2)\Delta f(t - N_{CP,l}T_s)}$$

--, therefor.

In Column 4, Lines 43-44, delete

"$p; \theta_{k,l} = j2\pi f_{NB-IoT} T_s (lN + \Sigma_{i=0}^{i} N_{CP,i});$" and insert -- $p; \theta_{k,l} = j2\pi f_{NB-IoT} T_s (lN + \Sigma_{i=0}^{l} N_{CP,i});$ --, therefor.

In Column 5, Line 4, delete "OFDM symbol i" and insert -- OFDM symbol l --, therefor.

In Column 5, Lines 19-20, delete

"$p; \theta_{k,l} = j2\pi f_{NB-IoT} T_s (lN + \Sigma_{i=0}^{i} N_{CP,i});$" and insert -- $p; \theta_{k,l} = j2\pi f_{NB-IoT} T_s (lN + \Sigma_{i=0}^{l} N_{CP,i});$ --, therefor.

In Column 7, Line 16, delete "$\theta_{k,l}$." and insert -- $\theta_{k,l'}$. --, therefor.

In Column 7, Line 39, delete "$\theta_{k,l}$." and insert -- $\theta_{k,l'}$. --, therefor.

In Column 7, Line 66, delete "symbol Z" and insert -- symbol l --, therefor.

In Column 8, Lines 20-21, delete

"$\theta_{k,l} = j2\pi f_{NB-IoT} T_s (lN + \Sigma_{i=0}^{i} N_{CP,i});$" and insert -- $\theta_{k,l} = j2\pi f_{NB-IoT} T_s (lN + \Sigma_{i=0}^{l} N_{CP,i});$ --, therefor.

In Column 17, Line 32, delete "$\theta_{k,l}$." and insert -- $\theta_{k,l'}$. --, therefor.

CERTIFICATE OF CORRECTION (continued)
U.S. Pat. No. 11,621,878 B2

In Column 18, Line 13, delete "$s_l^{(p)}(t)$" and insert -- $s_{l'}^{(p)}(t)$ --, therefor.

In Column 18, Line 15, delete "$\theta_{k,l}$." and insert -- $\theta_{k,l'}$. --, therefor.

In Column 18, Line 16, delete "$s_l^{(p)}(t)$" and insert -- $s_{l'}^{(p)}(t)$ --, therefor.

In Column 18, Line 34, delete "$0 \leq l \leq 56$," and insert -- $0 \leq l \leq 6$, --, therefor.

In Column 18, Line 40, delete "$0 \leq t < (N_{CP,l}+N)T_s$," and insert -- $0 \leq t \leq (N_{CP,l}+N)T_s$, --, therefor.

In Column 18, Line 64, delete "$B_{k,l}$" and insert -- $\theta_{k,l'}$ --, therefor.

In Column 18, Line 67, delete "l'=1." and insert -- l'=l. --, therefor.

In Column 19, Line 12, delete "$0 \leq t < (N_{CP,l}+N) \times T$." and insert -- $0 \leq t < (N_{CP,l}+N) \times T_s$. --, therefor.

In Column 19, Line 27, delete "$0 < l \leq 6$," and insert -- $0 \leq l \leq 6$, --, therefor.

In Column 20, Lines 32-33, delete "OFDM symbol i" and insert -- OFDM symbol l --, therefor.

In the Claims

In Column 33, Line 40, in Claim 2, delete "$s_l^{(p)}(t)$;" and insert -- $s_{l'}^{(p)}(t)$; --, therefor.

In Column 33, Line 48, in Claim 2, delete "$0 \leq t < (N_{CP,l}+N) \times T_s$." and insert -- $0 \leq t < (N_{CP,l}+N) \times T_s$, --, therefor.

In Column 33, Line 49, in Claim 2, delete "$N_{RB}^{DL}$" and insert -- $N_{RB}^{DL}$ --, therefor.

In Column 33, Line 50, in Claim 2, delete "$N_{sc}^{RB}$" and insert -- $N_{sc}^{RB}$ --, therefor.

In Column 33, Line 51, in Claim 2, delete "$a_{k,l}^{(p)}$" and insert -- $a_{k,l}^{(p)}$ --, therefor.

In Column 33, Line 60, in Claim 5, delete "$k^{(-)} = k + \lfloor N_{RB}^{DL} N_{sc}^{RB}/2 \rfloor;$" and insert

CERTIFICATE OF CORRECTION (continued)
U.S. Pat. No. 11,621,878 B2

-- $k^{(-)} = k + \lfloor N_{RB}^{DL} N_{sc}^{RB}/2 \rfloor;$ --, therefor.

In Column 33, Line 66, in Claim 5, delete "$a_{k,l}^{(p)}$" and insert -- $a_{k,l}^{(p)}$ --, therefor.

In Column 34, Line 10, in Claim 6, delete "$N_{sc}^{RB}=12$," and insert -- $N_{sc}^{RB}=12$,--, therefor.

In Column 34, Line 11, in Claim 6, delete "$N_{RB}^{DL}=3$" and insert -- $N_{RB}^{DL}=3$ --, therefor.

In Column 34, Line 11, in Claim 6, delete "$N_{RB}^{DL}=1$" and insert -- $N_{RB}^{DL}=1$ --, therefor.

In Column 34, Line 44, in Claim 11, delete "signal transmitted on" and insert -- signal on --, therefor.

In Column 34, Line 47, in Claim 11, delete "$s_l^{(p)}(t);$" and insert -- $s_l^{(p)}(t);$ --, therefor.

In Column 34, Line 55, in Claim 11, delete "$0 \leq t < (N_{CP,l}+N) \times T_s.$" and insert -- $0 \leq t < (N_{CP,l}+N) \times T_s$,--, therefor.

In Column 34, Line 56, in Claim 11, delete "$N_{RB}^{DL}$" and insert -- $N_{RB}^{DL}$ --, therefor.

In Column 34, Line 57, in Claim 11, delete "$N_{sc}^{RB}$" and insert -- $N_{sc}^{RB}$ --, therefor.

In Column 34, Line 58, in Claim 11, delete "$a_{k,l}^{(p)}$" and insert -- $a_{k,l}^{(p)}$ --, therefor.

In Column 34, Line 62, in Claim 12, delete "The network code" and insert -- The network node --, therefor.

In Column 34, Line 67, in Claim 14, delete "$k^{(-)} = k + \lfloor N_{RB}^{DL} N_{sc}^{RB}/2 \rfloor;$" and insert -- $k^{(-)} = k + \lfloor N_{RB}^{DL} N_{sc}^{RB}/2 \rfloor;$ --, therefor.

CERTIFICATE OF CORRECTION (continued)
U.S. Pat. No. 11,621,878 B2

In Column 35, Line 5, in Claim 14, delete "$a_{k,l}^{(p)}$" and insert -- $a_{k,l}^{(p)}$ --, therefor.

In Column 35, Line 15, in Claim 15, delete "$N_{sc}^{RB}=12$," and insert -- $N_{sc}^{RB}=12;$ --, therefor.

In Column 35, Line 17, in Claim 15, delete "$N_{RB}^{DL}=3$" and insert -- $N_{RB}^{DL}=3$ --, therefor.

In Column 35, Line 17, in Claim 15, delete "$N_{RB}^{DL}=1$" and insert -- $N_{RB}^{DL}=1$ --, therefor.

In Column 36, Line 1, in Claim 15, delete "$0 \leq l \leq 6$," and insert -- $0 \leq l \leq 6$; --, therefor.

In Column 36, Line 4, in Claim 15, delete "$0 \leq t \leq (N_{CP,l}+N) \times T_s$," and insert -- $0 \leq t \leq (N_{CP,l}+N) \times T_s$; --, therefor.